(12) United States Patent
Pawlak et al.

(10) Patent No.: US 6,359,281 B1
(45) Date of Patent: Mar. 19, 2002

(54) HIGH VOLTAGE DISTRIBUTION SYSTEM FOR SOLID STATE SCINTILLATION DETECTORS AND GAMMA CAMERA SYSTEM INCORPORATING THE SAME

(75) Inventors: John T. Pawlak, Lombard; George W. Dailey, Glen Ellyn, both of IL (US)

(73) Assignee: Siemens Medical Systems, Inc., Iselin, NJ (US)

(*) Notice: Subject to any disclaimer, the term of this patent is extended or adjusted under 35 U.S.C. 154(b) by 0 days.

(21) Appl. No.: 09/306,402

(22) Filed: May 6, 1999

(51) Int. Cl.[7] ................................ G01T 1/24
(52) U.S. Cl. ............................... 250/370.09
(58) Field of Search ............... 250/370.09, 370.08, 250/370.13, 370.14, 370.15, 370.12

(56) References Cited

U.S. PATENT DOCUMENTS 4,922,376 A * 5/1990 Pommer et al. ............ 361/715
5,237,203 A * 8/1993 Massaron .................. 257/688
5,786,597 A * 7/1998 Lingren et al. ......... 250/370.09

* cited by examiner

Primary Examiner—Constantine Hannaher
Assistant Examiner—Albert Gagliardi

(57) ABSTRACT

A high voltage distribution system for distributing a high voltage supply to a plurality of semiconductor radiation detector modules, includes a conductive strip connected to a high voltage supply. The conductive strip is preferably made of aluminum foil, and contacts a surface of each of the detectors. The conductive strip is held into contact with the semiconductor radiation detectors by applying pressure to said conductive strip with a pressure plate, including a compressible layer such as a foam layer. A vacuum is created in an area occupied by the semiconductor modules and the conductive strip. The high voltage distribution system allows a high negative voltage to be applied to the semiconductor detector modules with a minimum of attenuation. In a preferred embodiment, the detector modules are CZT modules, and the system is incorporated into a solid-state gamma camera for nuclear medicine imaging.

20 Claims, 3 Drawing Sheets

HIGH VOLTAGE DISTRIBUTION SYSTEM FOR SOLID STATE SCINTILLATION DETECTORS AND GAMMA CAMERA SYSTEM INCORPORATING THE SAME

BACKGROUND OF THE INVENTION

1. Field of the Invention

The present invention generally relates to nuclear medicine, and systems for obtaining nuclear medicine images of a patient's body organs of interest. In particular, the present invention relates to systems using semiconductor or solid-state detectors for obtaining nuclear medicine images by detecting radiation events emanating from a patient.

2. Description of the Background Art

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body.

Conventional gamma cameras utilize a scintillation crystal (usually made of sodium iodide) which absorbs the gamma photon emissions and emits light photons (or light events) in response to the gamma absorption. An array of photodetectors, such as photomultiplier tubes, is positioned adjacent to the crystal. The photomultiplier tubes receive the light photons from the crystal and produce electrical signals having amplitudes corresponding to the amount of light photons received. The electrical signals from the photomultiplier tubes are applied to position computing circuitry, wherein the location of the light event is determined, and the event location is then stored in a memory, from which an image of the radiation field can be displayed or printed.

Also known in the art are solid-state nuclear imaging cameras, see, e.g., U.S. Pat. Nos. 4,292,645 and 5,132,542. Such cameras use solid-state or semiconductor detector arrays in place of the scintillation crystal and photomultiplier tubes. In a solid-state camera, gamma rays are absorbed in a semiconductor material, creating electron-hole pairs in the semiconductor material. A bias voltage across the semiconductor detector causes the electrons and holes to form an electric current through the semiconductor material. The currents are converted by associated circuitry into electrical signals, which are processed to determine the location and magnitude of the gamma ray absorption event. While solid-state cameras offer potential benefits over the conventional scintillation crystal cameras in terms of reduced weight, improved resolution, improved uniformity, and increased imaging area, the use of such cameras has presented its own set of problems. In particular, early solid-state detectors made of germanium had to be cryogenically cooled to achieve acceptable performance.

Semiconductor detectors made of cadmium zinc telluride (CZT) have recently been proposed for use in solid-state gamma cameras. Such detectors may be operated at room temperature. As shown generally in FIG. 1, a plurality of detector modules 10 are formed of CZT material, wherein each module is made up of an array of detector elements mounted to a circuit carrier 12 having a plurality of connector pins 14. Circuit carrier 12 can be a printed circuit board, or alternatively may encapsulate a number of integrated circuit chips. An example of a solid-state gamma camera using CZT detector modules is shown in U.S. Pat. No. 5,786,597.

One shortcoming of the prior art is that CZT detector modules require the application of a high negative voltage to the cathode side of the module. For large field-of-view applications, wherein such modules are arranged in a two dimensional array, conventional techniques of routing the high negative voltage to each modules, such as utilizing cables, introduce undesirable attenuation, which diminishes the performance characteristics of the camera.

There thus exists a need in the art for an improved high voltage distribution system for a solid-state gamma camera using semiconductor modules, and especially CZT detector modules.

SUMMARY OF THE INVENTION

The present invention solves the existing need by providing a solid-state gamma camera, including a plurality of semiconductor detector modules arranged in an array, each module having a cathode surface and an anode surface, a conductive strip in contact with the cathode surfaces of each of the plurality of detector modules, a high voltage electrode providing a high voltage supply to the conductive strip, and a pressure plate forcibly pressing the conductive strip in contact with the cathode surfaces of the plurality of detector modules.

According to another aspect, the invention provides a high voltage distribution system for distributing a high voltage supply to a plurality of semiconductor radiation detector modules, comprising a conductive strip connected to a high voltage supply, and contacting a surface of each of the plurality of semiconductor radiation detectors, a pressure plate for forcing the conductive strip into contact with the plurality of semiconductor radiation detectors by applying pressure to the conductive strip, and a vacuum source for creating a vacuum in an area occupied by said semiconductor modules and said conductive strip. According to yet another aspect, the invention provides a method of distributing a high voltage supply to a plurality of semiconductor radiation detectors as performed by the function of the distribution system.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 1:
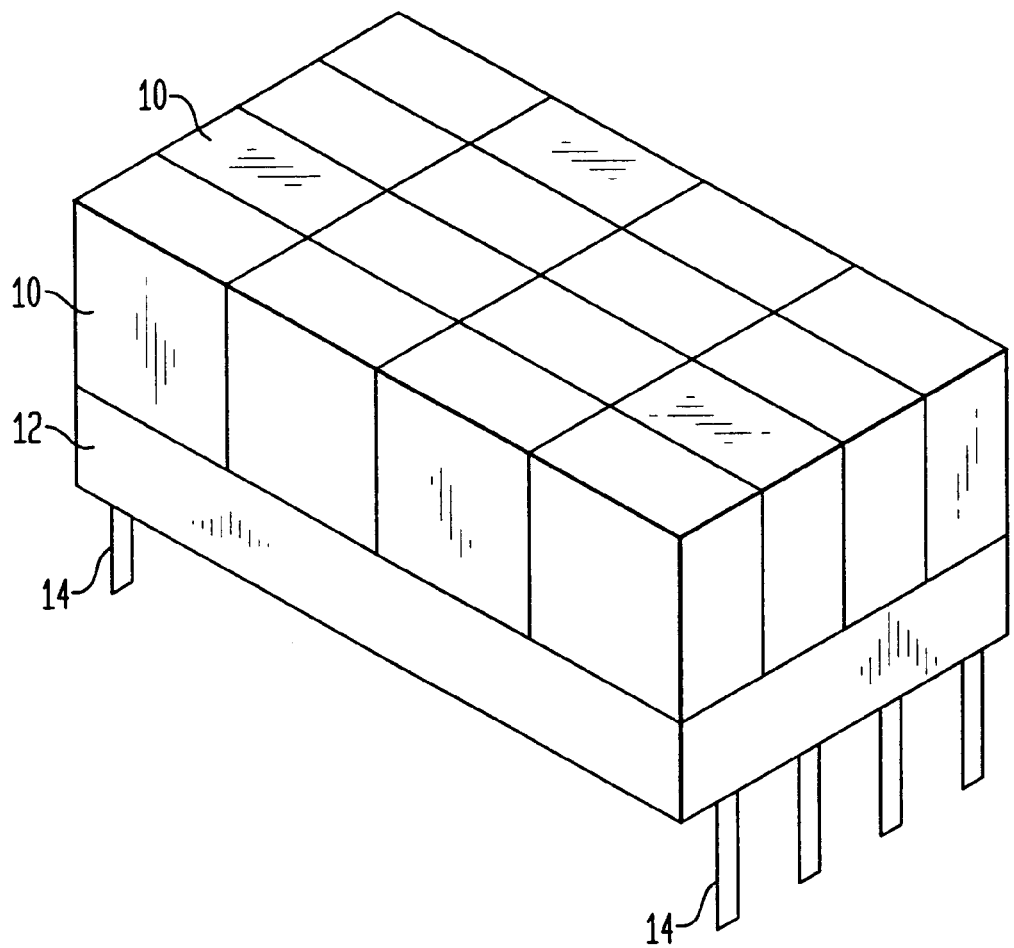
FIG. 1 is a perspective view of a semiconductor gamma radiation detector module applicable to the present
Figure 2:
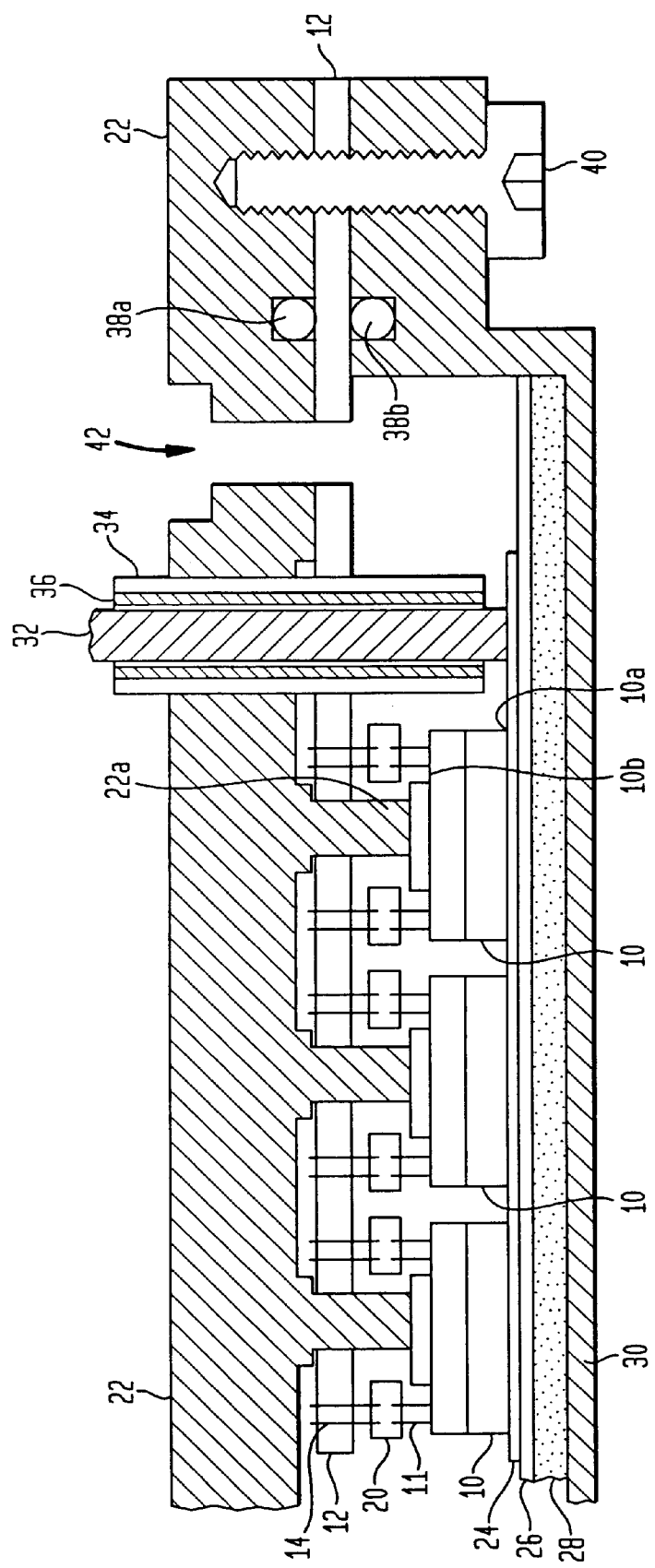
FIG. 2 is a cross-sectional view of a portion of a solid-state detector array according to one preferred embodiment of the present invention.

Referring to FIG. 2, a plurality of solid-state detector modules 10 are arranged in a two-dimensional array for imaging a radiation field, such as gamma ray radiation emanating from a patient who has been injected with or ingested a radiopharmaceutical. In the preferred embodiment, the solid-state detector modules 10 are made of cadmium zinc telluride (CZT) material.

Each module 10 is connected to a printed circuit board or circuit carrier 12 through a socket 20. Socket 20 provides electrical connection between pins 11 of the modules 10 and pins 14 of the printed circuit board 12.

A heat sink plate 22 has a plurality of fingers 22a, each making contact with a respective detector module 10. The heat sink plate is made of a heat absorbing, conductive material, such as aluminum alloy. The purpose of the heat sink plate 22 is to conduct heat away from the detector modules during operation of the camera.

Each module 10 has a cathode side 10a and an anode side 10b. For proper operation, the modules 10 must have a high negative voltage applied to their cathode surface 10a. According to the present invention, a thin conductive strip 24, preferably made of aluminum foil, is mounted on a high voltage insulator 26. The high voltage insulator 26 is made of a material having insulative resistance against relatively high voltage levels, such as −600V. Examples of suitable materials are Mylar, Kapton, silicone, and any thin film, low attenuation insulator material.

The high voltage insulator 26 is mounted on compressible layer 28. Compressible layer 28 can be made of foam, or other porous, compressible material as may be known in the art. A high voltage supply electrode or probe 32 is connected to a high negative voltage supply (not shown), and makes contact with the thin conductive strip 24. In this manner, high negative voltage is distributed to each detector module in the array by the thin conductive strip 24. The probe 32 is surrounded by a shield 36 made of any conductive material, and optionally an insulator material 34 may be provided to surround the shield. The shield 36 reduces noise interference from the probe to the remaining circuitry. An insulator is also provided between the conductive probe 32 and the shield 36.

An aluminum plate or back cap 30 is secured to the heat sink 22 by a plurality of screws 40 (only one of which is illustrated in FIG. 2 for simplicity). Seal rings 38a and 38b are provided around the periphery of the detector module array, and a vacuum connection 42 is provided to create a vacuum in the space between the heat sink 22 and the back cap 30 in the area of the detector module array. A vacuum source (not shown) is connected to the connection port 42 to evacuate the space interior to the seal rings 38a and 38b. It is noted that the connection port 42 need not be through the heat sink plate 22, but alternately may be provided through the back cap plate 30.

As the screws 40 are appropriately tightened, the back cap 30 applies pressure to the compressible layer 28, high voltage insulator 26, and thin conductive strip 24 to provide a solid contact between the conductive strip 24 and the cathode surface 10a of the detector module 10. Gamma radiation passes through the back cap 30, compressible layer 28, high voltage insulation layer 26, and conductive strip 24 and into the semiconductor material of the solid-state detector modules 10.

Figure 3:
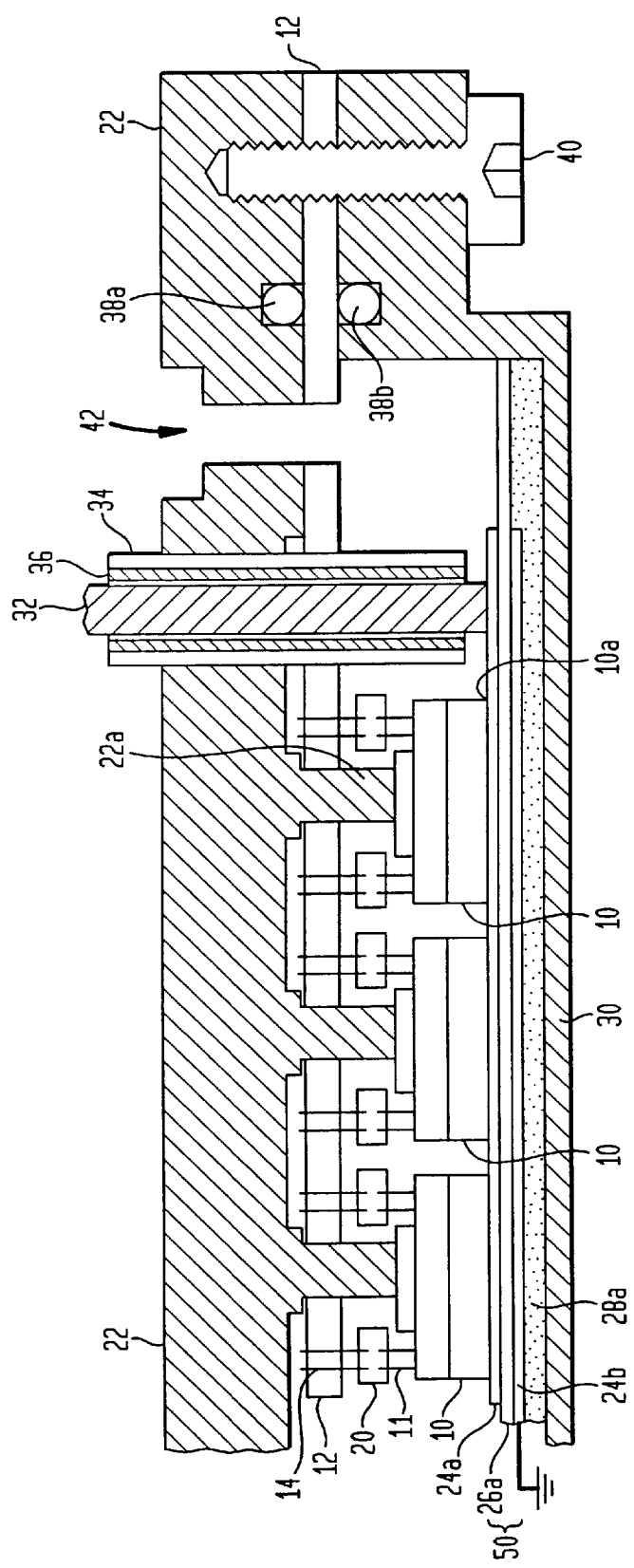
FIG. 3 is a cross-sectional view of a portion of a solid-state detector array according to a second preferred embodiment of the present invention.

A second preferred embodiment is illustrated in FIG. 3, wherein like elements of FIG. 2 are labeled with like reference numerals, and their description will not be repeated. According to this embodiment, a high voltage capacitor plate 50 is formed by first high voltage conductive foil layer 24a, high voltage insulator layer 26a, and grounded foil layer 24b. The foil layers are preferably made of aluminum, but other suitable conductive materials also may be used. A foam layer 28a and aluminum back cap 30 are provided under the capacitor plate.

The capacitor plate is created by the high voltage foil (at a high negative voltage, such as −600V), the insulator layer, and the grounded foil layer. As gamma events occur at the module, electrons are lost at the high voltage foil due to their migration within the module to the processing circuitry. By virtue of the capacitor plate 50, electrons depleted from the high voltage foil layer 24a are quickly replenished by electrons stored in the capacitor plate 50. In this way, the response of the modules may be further improved.

The combination of the vacuum and the mechanical preloading, which forces a solid contact between the conductive strip and the cathode surfaces of the solid-state detector modules, enables the required negative high voltage to be distributed to each of the detector modules in the array with a minimum of attenuation, thereby providing a significant improvement in the art over the conventionally used techniques.

The invention having been described, it will be apparent to those skilled in the art that the same may be varied in many ways without departing from the spirit and scope of the invention. Any and all such modifications are intended to be included within the scope of the following claims.

What is claimed is:

1. A solid-state gamma camera, comprising:
   a plurality of semiconductor detector modules arranged in an array, each module having a cathode surface and an anode surface;
   a conductive strip in contact with the cathode surfaces of each of said plurality of detector modules;
   a high voltage electrode providing a high voltage supply to said conductive strip; and
   a pressure plate forcibly pressing said conductive strip in contact with said cathode surfaces of said plurality of detector modules.

2. A solid-state gamma camera as set forth in claim 1, further comprising a compressible layer between said plate and said conductive strip.

3. A solid-state gamma camera as set forth in claim 2, wherein said compressible layer is made of a foam material.

4. A solid-state gamma camera as set forth in claim 2, further comprising a high voltage insulator between said compressible layer and said conductive strip.

5. A solid-state gamma camera as set forth in claim 1, wherein said conductive strip is made of aluminum foil.

6. A solid-state gamma camera as set forth in claim 1, further comprising a heat sink plate contacting each of said plurality of detector modules, said heat sink plate being located opposite said pressure plate.

7. A solid-state gamma camera as set forth in claim 6, wherein said pressure plate is connected to said heat sink plate with at least one screw.

8. A solid-state gamma camera as set forth in claim 7, further comprising a vacuum seal between said heat sink plate and said pressure plate.

9. A solid-state gamma camera as set forth in claim 8, further comprising a vacuum port in one of said heat sink plate or said pressure plate for connection to a vacuum source.

10. A solid-state gamma camera as set forth in claim 1, wherein said semiconductor detector modules are made of cadmium zinc telluride (CZT).

11. A high voltage distribution system for distributing a high voltage supply to a plurality of semiconductor radiation detector modules, comprising:
    a conductive strip connected to a high voltage supply, and contacting a surface of each of said plurality of semiconductor radiation detectors;
    means for forcing said conductive strip into contact with said plurality of semiconductor radiation detectors by applying pressure to said conductive strip; and
    means for creating a vacuum in an area occupied by said semiconductor modules and said conductive strip.

12. A high voltage distribution system as set forth in claim 11, wherein said conductive strip is made of aluminum foil.

13. A high voltage distribution system as set forth in claim 11, wherein said forcing means comprises a pressure plate.

14. A high voltage distribution system as set forth in claim 11, wherein said creating means comprises a vacuum seal around said semiconductor detector modules and a vacuum port for connection to a vacuum source.

15. A method of distributing a high voltage supply to a plurality of semiconductor radiation detector modules, comprising the steps of:

connecting a conductive strip to a high voltage supply;

forcing said conductive strip into contact with a surface of each of said plurality of semiconductor radiation detectors by applying pressure to said conductive strip; and creating a vacuum in an area occupied by said semiconductor modules and said conductive strip.

16. A solid-state gamma camera, comprising:

a plurality of semiconductor detector modules arranged in an array, each module having a cathode surface and an anode surface;

a capacitor plate in contact with the cathode surfaces of each of said plurality of detector modules;

a high voltage electrode providing a high voltage supply to said capacitor plate; and a pressure plate forcibly pressing said capacitor plate in contact with said cathode surfaces of said plurality of detector modules.

17. A solid-state gamma camera as set forth in claim 16, further comprising a compressible layer between said pressure plate and said capacitor plate.

18. A solid-state gamma camera as set forth in claim 17, wherein said compressible layer is made of a foam material.

19. A solid-state gamma camera as set forth in claim 17, further comprising a high voltage insulator between said compressible layer and said capacitor plate.

20. A solid-state gamma camera as set forth in claim 16, wherein said capacitor plate is made of a high voltage aluminum foil layer, a grounded aluminum foil layer, and a high voltage insulator layer sandwiched between said high voltage foil layer and said grounded foil layer.

* * * * *